United States Patent [19]

Mravic et al.

[11] 4,405,386
[45] Sep. 20, 1983

[54] PROCESS AND APPARATUS FOR IMPROVING COLD ROLLABILITY AND/OR STRIP ANNEALABILITY OF METALS AND METAL ALLOYS

[75] Inventors: Brian Mravic, North Haven; Eugene Shapiro, Hamden, both of Conn.

[73] Assignee: Olin Corporation, New Haven, Conn.

[21] Appl. No.: 365,726

[22] Filed: Apr. 5, 1982

[51] Int. Cl.³ .......................... C21D 8/02; C22F 1/08; C22F 1/04
[52] U.S. Cl. ........................ 148/11.5 A; 148/11.5 R; 148/11.5 C; 148/12 R; 148/154; 266/129; 266/103; 72/366; 219/7.5
[58] Field of Search ............... 148/11.5 A, 11.5 C, 148/11.5 R, 12 D, 12 R, 12 C, 13, 131, 150, 152, 154, 156; 72/200, 202, 205, 365, 366; 266/103, 102, 129; 219/6.5, 7.5

[56] References Cited

U.S. PATENT DOCUMENTS

| | | | |
|---|---|---|---|
| 1,870,577 | 8/1932 | Lamb | 148/152 |
| 2,256,947 | 9/1941 | Lewis | 148/154 |
| 3,264,143 | 8/1966 | Turner | 148/11.5 A |
| 3,267,252 | 8/1966 | Morris | 219/7.5 |
| 3,480,486 | 11/1969 | Tanaka et al. | 148/13.1 |
| 3,522,116 | 7/1970 | Coleman | 148/154 |
| 3,536,540 | 10/1970 | Rauch | 148/13 |
| 3,613,425 | 10/1971 | Roberts | 72/366 |
| 3,836,743 | 9/1974 | Wardwell | 219/10.43 |
| 3,848,104 | 11/1974 | Locke | 148/11.5 R |
| 3,877,867 | 4/1975 | Tsuchiya et al. | 266/103 |
| 4,151,014 | 4/1979 | Charschan et al. | 148/13 |

FOREIGN PATENT DOCUMENTS 1597066 9/1981 United Kingdom .

Primary Examiner—L. Dewayne Rutledge
Assistant Examiner—Robert L. McDowell
Attorney, Agent, or Firm—Barry L. Kelmachter; Howard M. Cohn; Paul Weinstein

[57] ABSTRACT

Selective heating of edge and near-edge portions of a strip material is used to increase the ductility of the strip material at these portions and to improve the cold rollability and/or strip annealability of the strip material. The selective heating may be performed either by radiant heating or by induction heating.

26 Claims, 6 Drawing Figures

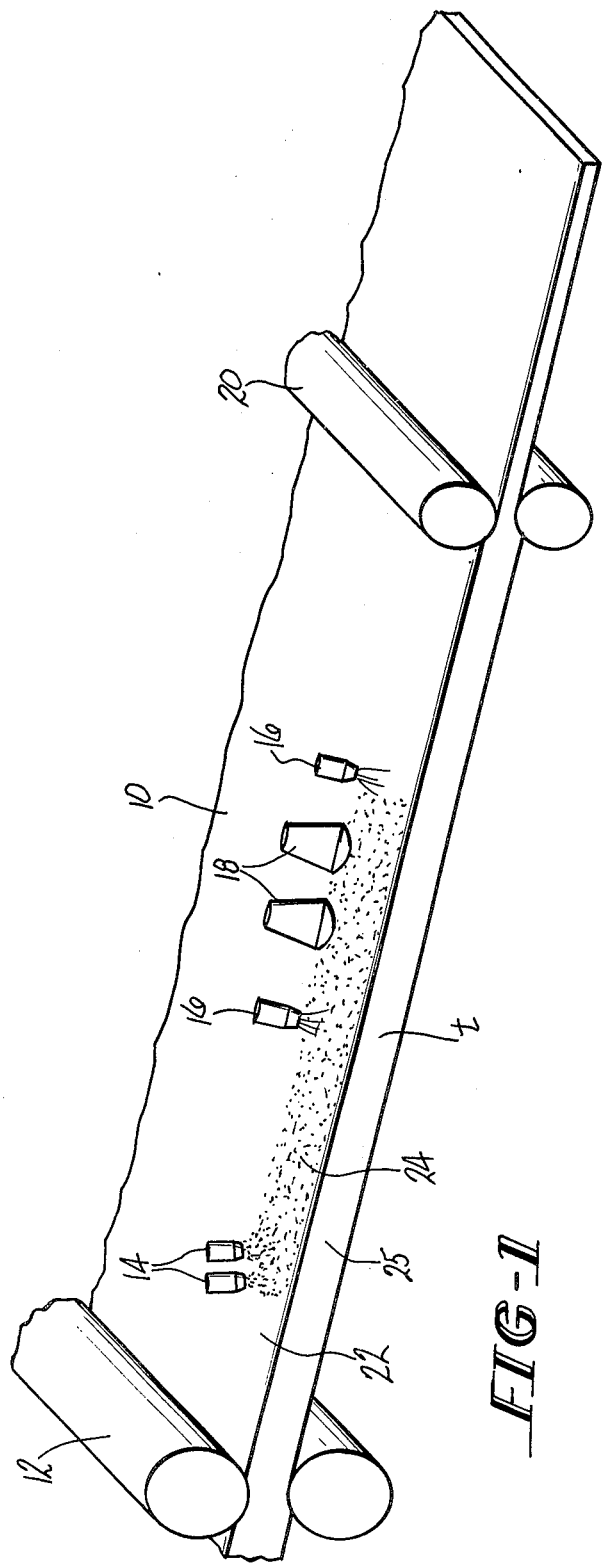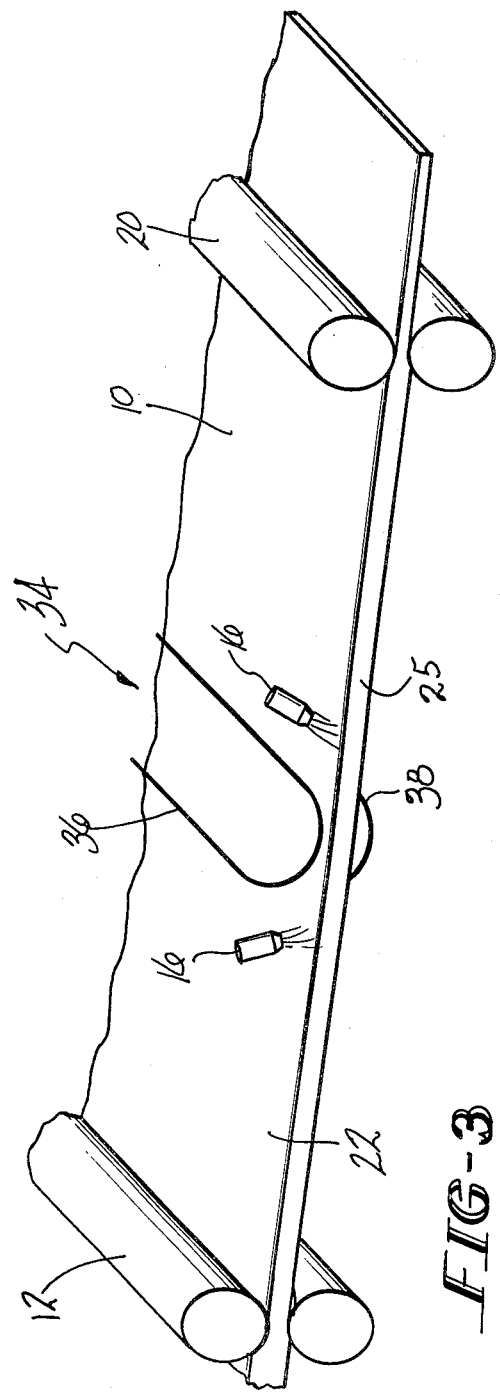

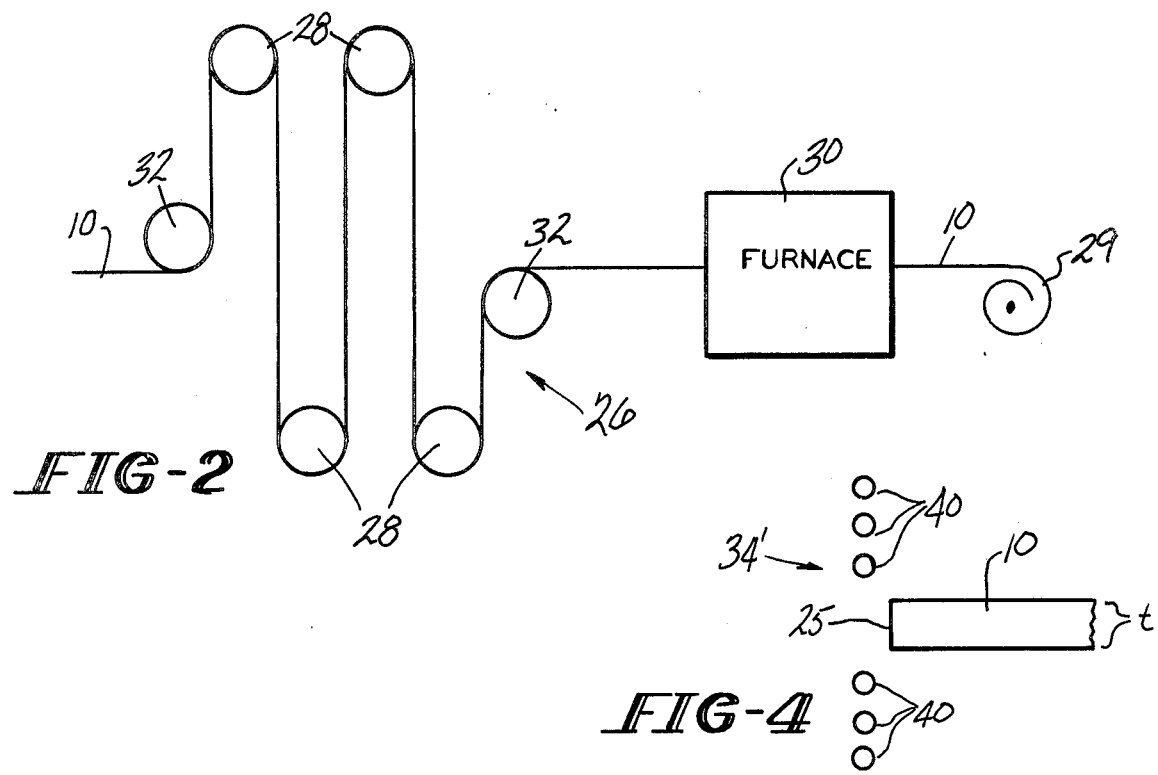
FIG-2
FIG-4
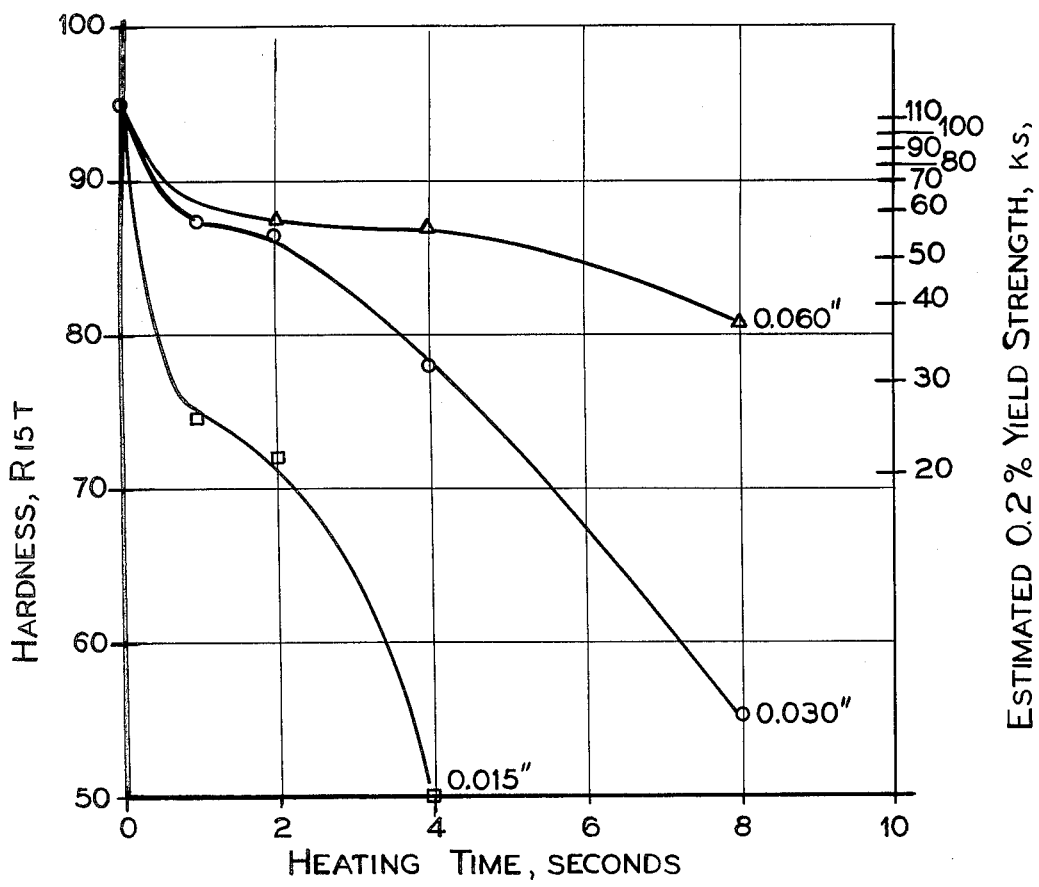
FIG-5

PROCESS AND APPARATUS FOR IMPROVING COLD ROLLABILITY AND/OR STRIP ANNEALABILITY OF METALS AND METAL ALLOYS

The invention relates to techniques for selectively annealing a portion of a metal or metal alloy strip material to improve the cold rollability and/or strip annealability of the strip material.

Metals are heat treated in different ways for many different purposes. For example, a spring may be made strong by hardening or a shaft may be hardened so that it will wear better. Frequently, localized heat treatments are used to harden selected portions of articles. U.S. Pat. Nos. 3,536,540 to Rauch, 3,836,743 to Wardwell et al. and 3,848,104 to Locke illustrate such treatments.

It is also known in the prior art that localized heat treatments may be utilized to soften portions of articles for a variety of purposes such as stress relief or creation of an article having different physical properties in different portions. A number of different techniques are used for performing such localized heat treatments.

U.S. Pat. No. 1,870,577 to Lamb discloses a method of heat treating edge portions of a strip material. Lamb's method subjects the edges to heat while the strip material is in coil form. Heated bodies, such as heated metal plates, are placed in contact with the top and/or bottom portions of the coil. The width of the edge strip which is heat treated or annealed may be controlled by controlling the amount of heat applied.

Another approach for localized annealing of a metal component is shown in U.S. Pat. No. 3,480,486 to Tanaka et al. In this approach, metal parts are annealed by first coating the part to be annealed with an absorbent of radiant energy and then radiantly heating the part. Tanaka et al.'s method is used to heat metal articles, particularly steel articles, for local annealing or stress relieving of a weld portion.

Yet another approach for annealing a selected portion of a hardened metallic workpiece uses a pulsed laser beam. A parameter of the pulsed laser beam such as intensity and/or pulse length may be regulated to provide a controlled degree of intermediate temper at the selected portion. U.S. Pat. No. 4,151,014 and U.K. Pat. No. 1,597,066, both to Charschan et al., illustrate this approach.

In most metals and metal alloys, the maximum degree of cold reduction that can be imposed on a strip material before an interanneal is required is determined by the onset of significant edge cracking. Interannealing imposes additional processing costs which are proportional to the number of such anneals that are required. It is, therefore, highly desirable that the total reduction taken before an interanneal be as great as possible so as to reduce the number of such anneals and the costs associated therewith.

The degree of reduction that can be sustained before the onset of significant edge cracking depends on such factors as the initial edge shape of the strip material, the degree of front and back tension applied during the working process, and the intrinsic ductility of the metal or metal alloy being processed. Ordinarily, when the ductility is exhausted for a given edge shape and given working conditions, the metal or metal alloy strip material is subjected to a full anneal to restore the ductility. If such a full anneal were not performed, edge cracks could develop and propagate sufficiently to require extensive edge shearing with its accompanying costly metal loss or, if the cracks become extensive enough, fracture of the strip material during rolling.

A related aspect of this problem arises with respect to continuous strip annealing of certain metals and metal alloys. In metals and metal alloys which have very limited resistance to crack propagation, fracture of the strip material can occur as the strip material is passed around a series of looping rolls prior to entrance into a furnace. The cause of fracture in these instances is primarily the propagation of edge cracks, produced during cold working, under the stresses imposed by the tension on the strip material and by the bending over the looping rolls. In the past, this problem has been overcome by limiting the degree of cold reduction in a prior operation such as cold rolling so as to minimize the extent of the largest edge crack.

The instant invention contemplates a technique for improving the cold rollability and/or strip annealability of metal or metal alloy strip material. The technique comprises heating of selected areas of the strip material to increase the ductility of the metal or metal alloy in those areas. Moreover, the critical areas to be heated are the edge and near-edge regions of the strip material. Heating is preferably carried out without significantly annealing the bulk of the strip material and in a manner such that the imposed thermal history is sufficient to cause appreciable softening through such processes as disordering, recovery, recrystallization, and grain growth.

The heat treatment of the instant invention may be carried out after a desired amount of cold working has been imposed on the strip material and may be followed by additional cold working of the strip material. Alternatively, or in addition, the heat treatment may be carried out after cold working has been completed and prior to strip annealing. In the first instance, the heat treatment may be performed either on-line immediately after the cold working operation or in a seperate off-line operation. In the second instance, it may be carried out either on-line prior to looping the strip material about the looping rolls of a heat treating apparatus such as a strip annealer or in a separate off-line operation.

The heat treatment of the instant invention may be accomplished effectively by two methods. In the first, radiant heating is used to selectively heat an area adjacent at least one edge of the strip material. In using this metod, it may be necessary to apply a radiation absorbant coating to the area to be heated so that sufficiently high heating rates are obtained. In the second, induction heating is utilized. In this method, the strip material is passed through or in the proximity of a suitable induction coil having an alternating magnetic field. Eddy currents are induced in the strip material at the desired area. The eddy currents cause resistive heating in the selcted area.

It is an object of the present invention to provide a practical and efficient process and apparatus for improving the cold rollability and/or strip annealability of a metal or metal alloy strip material.

Another object of the present invention is to provide a process and apparatus as above which permits the total reduction that can be taken in the strip material before full annealing is required to be maximized.

Yet another object of the present invention is to provide a process and apparatus as above for heat treating selcted areas of the strip material.

These and other objects will become more apparent from the following description and drawings.

Embodiments of the apparatus for selectively heating portions of the strip material according to this invention are shown in the drawings, wherein like numerals depict like parts.

FIG. 1 is a schematic representation of an apparatus for heating selected areas of a metal or metal alloy strip.

FIG. 2 is a schematic representation of a continuous strip annealer which may be used in conjunction with the apparatus of FIG. 1.

FIG. 3 is a schematic representation of an alternative embodiment of an apparatus for heating selected areas of a metal or metal alloy strip.

FIG. 4 is a schematic representation of an alternative embodiment of an induction coil suitable for use in the apparatus of FIG. 3.

FIG. 5 is a graph showing the effects of radiant heating on a metal alloy strip material.

Figure 6:
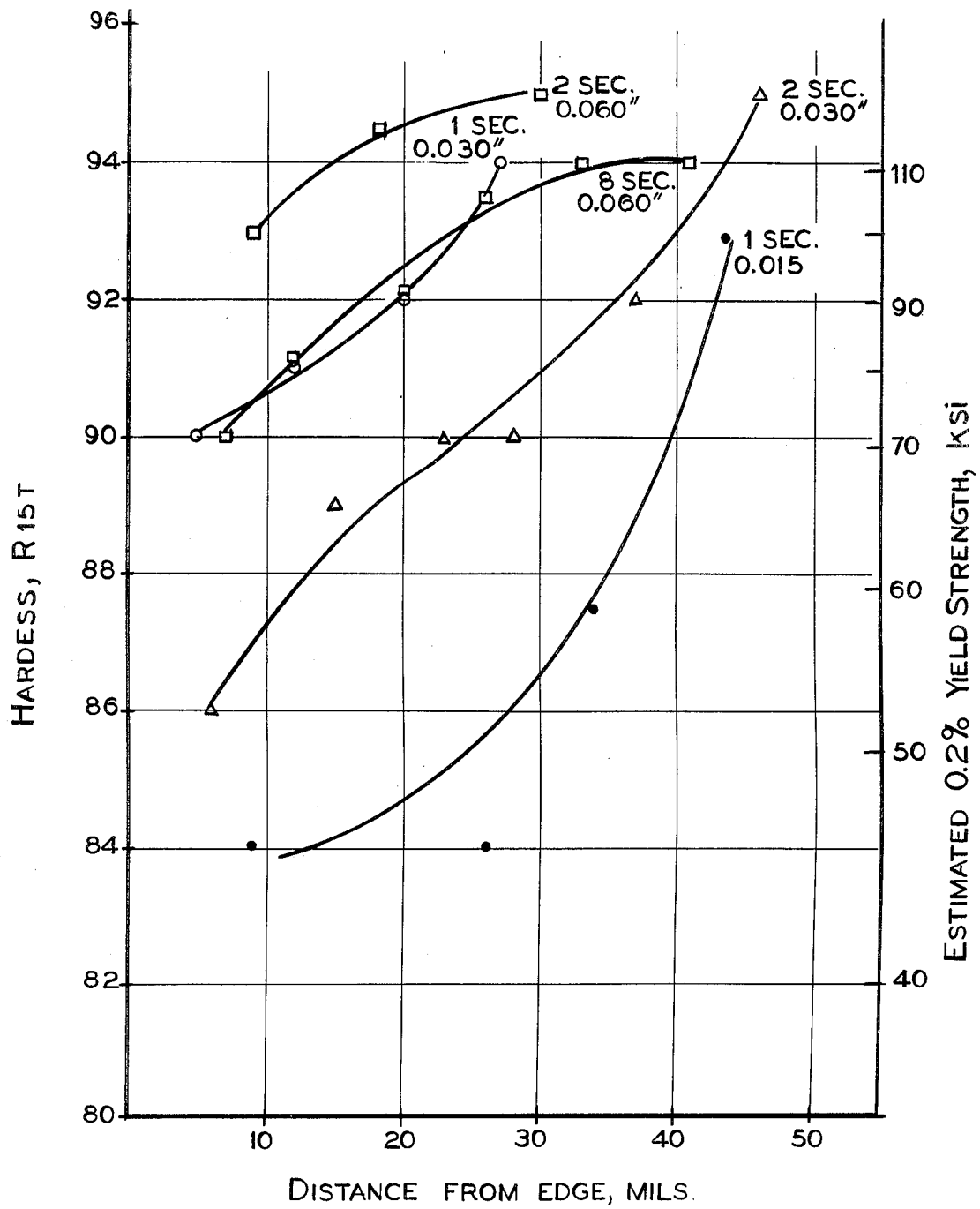
FIG. 6 is a graph showing the effects of induction heating on a metal alloy strip material.

This invention discloses concepts and means for heating selected areas of metal or metal alloy strip materials for improving the cold rollability and/or strip annealability of the strip material. The improvements in cold rollability and/or strip annealability are caused by the increase in ductility in the heated areas of the strip material.

The process and apparatus of the instant invention have applicability to a wide range of metals and metal alloys including but not limited to copper and its alloys, iron and its alloys and aluminum and its alloys.

Referring now to FIG. 1, there is shown a metal or metal alloy strip material 10 exiting a rolling mill 12 where a desired reduction in the initial thickness of the strip material has been taken. The configuration of the rolling mill 12 forms no part of the instant invention. Any conventional rolling mill as is known in the art including but not limited to a two-high mill, a four-high mill and a cluster mill may be used.

Ordinarily, the amount of reduction taken by the rolling mill 12 would be limited to that which does not cause substantial cracks to form in the edge portions 25 of the strip material. However, by using the instant invention, rolling mill 12 may be operated so as to take a substantially larger reduction than that ordinarily taken. This is because the instant invention changes the strip material structure to tolerate more substantial cracks at the edge portions 22 and 25. However, it should be apparent that the reduction taken by rolling mill 12 should not be so great that cracks are created which would fracture strip material 10.

After exiting rolling mill 12, strip material 10 is passed to a station where an area 22 of the strip material 10 to be heat treated preferably has an absorbant coating 24 applied thereto. In alloys with a high reflectivity, it is desirable to coat the area or areas to be heated with an absorbant coating so sufficiently high heating rates may be obtained. When strip material is formed from certain metals or metal alloys, the application of coating 24 may not be required. When a coating 24 is applied, the area that will be heated is in part determined by the area of the applied coating.

Coating 24 may be applied in any suitable manner to any number of surfaces or any number of areas of strip material 10 as are desired to be heated. For example, coating 24 may be applied using spray nozzles 14. Spray nozzles 14 may be supplied with coating material from a source not shown such as a storage tank via a fluid transfer system not shown having suitable conduits, pumps, and/or valves. In lieu of spray nozzles, the coating 24 may be applied to strip material 10 by brush.

Coating 24 may comprise any suitable material known in the art that has a high absorption coefficient for the frequency of radiation being utilized. Preferably, coating 24 is formed from a material that either will burn off during heating or can be easily removed. It is desirable to use such a material to prevent formation of a film on the strip material and to prevent deposition of such a film on any subsequent apparatus such as cold working apparatus 20 or looping rolls 28. In a preferred embodiment, the absorbant coating comprises a dispersion of graphite in an alcohol solution.

After the coating has been applied, the strip material 10 is passed to a station where the selected areas are subjected to a heat treatment. Heat may be supplied by any suitable conventional radiation heating source 18 such as a quartz tube lamp or a laser. The selected area or areas are subjected to the heat treatment for a period of time sufficient to soften them and increase their ductility.

The size of the area heated may be controlled by controlling the distance between radiation heating source 18 and the area to be heated and the size, frequency, power input and the shape of the reflecting means of the radiation heating source 18. Power input is preferably controlled to insure that the desired softening is accomplished without overheating in edge and near-edge portions of strip material 10. Overheating can result in such undesirable effects as excessive oxidation, melting and phase transformations. A suitable magnitude of power input is determined by such factors as the metal or alloy forming the strip material and its reflectivity and thermal conductivity, the thickness of the strip material, and the speed at which the strip material moves past heating source 18.

Only edge and near-edge portions of strip material 10 are heat treated. For materials having a thickness greater than 0.020", the area to be heated preferably extends inwardly from the edge 25 up to about 100 times the thickness t of the strip material 10. Most preferably for these materials, the area to be heated extends inwardly from the edge about 10 to about 50 times the thickness t. For materials having a thickness less than 0.020", the area to be heated may extend inwardly from the edge 25 up to about 500 times the thickness. Preferably, the heated area in materials having a thickness less than 0.020" does not extend inwardly more than about ¼". It should be noted that the treated area could have any desired length.

When it is desirable to prevent substantially any oxidation of the edges during heating, the selective heating operation of the instant invention may be performed in a protective atmosphere. Oxidation on the edges could scar and scratch components such as rolls in subsequent operations such as cold working and strip annealing. Any suitable protective atmosphere such as an inert gas may be utilized. Nozzles 16 may be provided to spray the protective gases over the area or areas to be heated. Nozzles 16 may be supplied with the protective gases in any suitable manner from any suitable source of gas not shown via any suitable supply system not shown. In lieu of nozzles, a conventional hood arrangement not shown may be used to surround the area or areas to be heated with protective gases. Any suitable hood arrangement as is known in the art may be utilized.

If desired, a mechanism not shown for cooling the heated area or areas may be provided for preventing oxidation of the strip material as the heated area or areas emerge from the protective gases and are contacted by ordinary atmosphere. Any suitable cooling arrangement as is known in the art may be utilized.

After strip material 10 has been selectively annealed and had its ductility increased at edge and near-edge areas 25 and 22, it may be further cold worked using any desired cold working apparatus such as rolling mill 20 and/or heat treated using any suitable apparatus such as the continuous strip annealer 26 of FIG. 2. When subjected to further cold working such as cold rolling, greater total reductions in the thickness of the strip material 10 can be taken because of the increased ductility of the selectively heated area or areas.

When strip material 10 is to be further processed using a strip treating apparatus such as continuous strip annealer 26, it is subjected to bending stresses caused by looping the strip material around looping rolls 28 and guide rolls 32 before entering furnace 30. Furthermore, it is subjected to tensile stresses imposed by tensioning means such as coiler 29 for pulling the strip material through the annealer 26. Ordinarily, strip fracture is caused by propagation of edge cracks formed in prior cold work operations by these bending and tensile stresses. However, by providing a strip having selected areas such as the edge and near-edge areas 25 and 22 with increased ductility, it is possible to avoid such strip fracture. Strip annealer 26 does not form part of the instant invention and may have any desired configuration of looping rolls 28 and any well known conventional furnace using any suitable atmosphere.

In operation, strip material 10 is passed through a cold working apparatus such as rolling mill 12 for reducing its initial thickness a desired amount. Strip material 10 may be subjected to one or more such cold working operations prior to being subjected to the selective heat treatment of the instant invention. Ordinarily, the reduction taken by the cold working apparatus is limited to that at which substantial edge cracks begin to appear. However, by using the instant invention, a larger reduction in strip material thickness may be taken before substantial edge cracks nucleate and because more substantial edge cracks may be tolerated. After cold working, a radiation absorbant coating 24 may be applied, if needed, to each area 22 of the strip material selected to be heated. Prior to heating, each selected area 22 may be surrounded by protective gases. The selected area or areas 22 are then subjected to heat from radiation heating source 18 for a time period sufficient to soften and increase the ductility of each selected area 22. After the selective heat treatment, strip material 10 may be further cold worked and/or fully annealed.

In lieu of the radiant heating source 18 of FIG. 1, it is possible to selectively anneal strip material 10 using an inductive heating system. Such an inductive heating system is illustrated in FIGS. 3 and 4. As described hereinbefore, a desired reduction in strip thickness may be taken using a cold working apparatus such as rolling mill 12. After exiting the cold working apparatus, strip material 10 is passed to a station having inductive heating means 34. If desired, the area or areas 22 to be heated may be surrounded by protective gases in the manner described hereinbefore to prevent oxidation of the strip material 10.

Induction heating means 34 may have any suitable coil configuration. For example, inductive heating means 34 may comprise upper 36 and lower 38 coils between which the strip material passes. Alternatively, inductive heating means 34 may comprise a split coil 40 having several turns adjacent one or more of the edges 25 of the strip material. Passing the strip through or in the proximity of at least one coil which has a current flowing therethrough that creates an alternating magnetic field causes eddy currents to be induced in strip material 10. These eddy currents in turn heat the selected area or areas 22.

By controlling the induction frequency and current and by properly positioning each coil relative to the strip, heating may be confined to a suitably narrow region near the edge or edges 25 of strip material 10. The frequency, current, power input, the time of exposure, and coil configuration utilized will depend on the conductivity of the metal or alloy being heated, the speed of the strip material, and the thickness of the strip material. Any suitable frequency, current, power input, exposure time, and coil configuration may be utilized to anneal the area or areas 22 as long as overheating does not occur and sufficient softening is produced.

Depending upon the material being heated, inductive heating means 34 may also have a susceptor not shown. The susceptor may have any suitable configuration.

If desired, a cooling arrangement not shown may be provided to cool the selectively heated area or areas as they emerge from the protective gases or the heating means 34 so as to prevent oxidation of the strip material. Any suitable conventional cooling arrangement as it known in the art may be utilized.

After the strip material 10 has been subjected to the selective heat treatment, it may be passed to a suitable cold working apparatus such as rolling mill 20 for further cold working and/or to suitable heat treating apparatus such as continuous strip annealer 26.

In operation, strip material 10 exits rolling mill 12 at a suitable strip speed. The strip material is passed to inductive heating means 34 for selectively heating of an area or areas 22 of strip material 10. The extent of each area 22 to be heated may be substantially confined to a desired area by choosing a suitable coil configuration, frequency, current, power input and period of exposure. The area or areas 22 should be subjected to the heat treatment for a period of time sufficient to soften each area 22 to a desired degree without overheating and to increase its ductility. After the selective heat treatment, strip material 10 may be further cold worked and/or heat treated as discussed hereinabove.

While the radiant heating system has been illustrated in terms of heating a selected area on one surface of the strip material, it is possible to achieve heating of selected areas on two opposed surfaces of the strip material by providing radiant heat sources adjacent each of the opposed surfaces.

While selective heating of an area adjacent one edge of the strip material has been illustrated, it is possible to selectively heat portions adjacent two opposed edges of strip material 10 by providing suitable radiant or inductive heating means adjacent both opposed edges.

In order that the invention may be more fully understood, the following examples are given by way of illustration.

EXAMPLE I

Strips of cold rolled and order hardened copper alloy C688 having thicknesses of 0.015", 0.030", and 0.060", respectively, were subjected to radiant heating for a time period up to about 8 seconds. Prior to heating, the strips were coated with a radiation absorbant coating comprising a dispersion of graphite in alcohol. Heating was accomplished from both sides using tungsten filament quartz tube lamps with a total radiant power density of about 1300 watts/in$^2$. The results are shown in FIG. 5. The data demonstate that exposure times of the order of one second are sufficient to decrease the hardness to a value that corresponds to an estimated yield strength of about 60 ksi which would be typical of a nearly completely recrystallized material.

EXAMPLE II

Strips of cold rolled and order hardened copper alloy C688 having thicknesses of 0.015", 0.030" and 0.060" were subjected to induction heating for an exposure period of up to 8 seconds. Heating was accomplished by placing a 3"×4" strip of material inside a 1" gap in a 10-turn, 1" diameter induction coil such that the edge of the strip nearly coincided with the edge of the coil. Power input was about 15 kw at a frequency of about 10 KHz. The results are shown in FIG. 6. The results indicate that an exposure time of 1 second was sufficient to completely recrystallize material of 0.030" gauge or thinner and to decrease the hardness of all of the samples.

Accordingly, all of the above examples provide for a copper alloy strip material that, when selectively heated either by radiant heating means or inductive heating means, has areas that exhibit increased ductility and decreased hardness. As a result, the cold rollability and/or strip annealability of these materials is improved. It should be recognized that the above data are only illustrative. The instant process for treating strip materials may be carried out over a wide range of the parameters discussed herein and should not be limited to those specified herein.

While the cold working of the strip material has been described in terms of rolling mills and cold rolling, the cold working of the strip material can be performed by any suitable apparatus.

While the selective heat treatment has been described in conjunction with processes such as cold working and/or heat treating, it may also be used in conjunction with other tension processes that impose similar stresses such as tension leveling, roller leveling, etc.

While the selective heating apparatus has been illustrated as being used in an on-line arrangement, it may also be used in a separate off-line operation.

The patents set forth in the specification are intended to be incorporated by reference herein.

It is apparent that there has been provided in accordance with this invention a process and apparatus for improving the cold rollability and/or strip annealability of metals and metal alloys which fully satisfies the objects, means, and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

We claim:

1. Process for improving the cold rollability of a strip material, said process comprising:
   providing a metal or metal alloy strip material having an initial thickness;
   cold working said strip material to obtain a desired reduction in said thickness;
   selectively heating edge and near-edge portions of said material without significantly annealing the bulk of said strip material to increase the ductility of the material at said portions and the amount of reduction that can be taken before the onset of significant edge cracking; and
   further cold working said strip material,
   whereby said increased ductility at said portions and amount of reduction that can be taken permit the total reduction taken in said strip material before full annealing is required to be maximized.

2. The process of claim 1 wherein said selective heating step comprises:
   providing means for heating by radiation; and
   heating said edge and near-edge portions with said radiation heating means.

3. The process of claim 2 further comprising:
   applying a radiation absorbant coating to said edge and near-edge portions prior to said heating.

4. The process of claim 1 wherein said selective heating step comprises:
   providing means for heating by induction; and
   heating said edge and near-edge portions with said induction heating means.

5. The process of claim 1 further comprising:
   providing a protective atmosphere about said edge and near-edge portions so that said heating does not cause substantially any oxidation of said strip material.

6. The process of claim 1 further comprising:
   fully annealing said strip material after said last working step.

7. The process of claim 1 wherein said heating step comprises:
   heating areas adjacent two opposed edge portions of said material.

8. Process for enhancing the strip annealability of a strip material in a cold worked condition, said process comprising:
   providing a metal or metal alloy strip material having an initial thickness;
   cold working said material to obtain a desired reduction in said thickness;
   providing means for strip annealing said material; and
   passing said material through said strip annealing means, wherein the improvement comprises:
   selectively heating edge and near-edge portions of said material without significantly annealing the bulk of said strip material prior to said material being passed through said strip annealing means to increase the ductility of said portions and to increase said strip annealability by reducing the possibility of strip fracture as a result of the propagation of edge cracks.

9. The process of claim 8 wherein said selective heating step comprises:
   providing means for heating by radiation; and
   heating said edge and near-edge portions with said radiation heating means.

10. The process of claim 9 further comprising:
    applying a radiation absorbant coating to said edge and near-edge portions prior to said heating.

11. The process of claim 8 wherein said selective heating step comprises:

providing means for heating by induction; and heating said edge and near-edge portions with said induction heating means.

12. The process of claim 8 further comprising:

providing a protective atmosphere about said edge and near-edge portions so that said heating does not cause substantially any oxidation of said strip material.

13. The process of claim 8 wherein:

said strip annealing means has looper rolls about which said strip material passes and means for applying a forward tensile force to said strip material; and said heating step reducing the stresses in said material caused by passing said strip about said looper rolls and by said forward tensile force.

14. The process of claim 8 wherein said heating step comprises:

heating areas adjacent two opposed edge portions of said material.

15. An apparatus for improving cold rollability of a metal or metal alloy strip material having an initial thickness, said apparatus comprising:

first means for cold working said strip material to obtain a desired reduction in said thickness;

second means for further cold working said strip material; and means for maximizing the total reduction that can be taken in said strip material before full annealing is required, said maximizing means comprising means for selectively heating edge and near-edge portions of said material without significantly annealing the bulk of said material prior to said material being passed to said second cold working means, said selective heating means increasing the ductility of the material at said portions and the amount of reduction that can be taken before the onset of significant edge cracking.

16. The apparatus of claim 15 wherein said selective heating means comprises:

means for heating said edge and near-edge portions by radiation.

17. The apparatus of claim 16 further comprising:

means for applying a radiation absorbant coating to said edge and near-edge portions prior to heating.

18. The apparatus of claim 15 wherein said selective heating means comprises:

means for inductively heating said edge and near-edge portions.

19. The apparatus of claim 15 further comprising:

means for providing a protective atmosphere about said edge and near-edge portions so that said heating does not cause substantially any oxidation of said strip material.

20. The apparatus of claim 15 further comprising:

means for fully annealing said strip material.

21. An apparatus for enhancing strip annealability of a metal or metal alloy strip material having an initial thickness in a cold worked condition, said apparatus comprising:

means for cold working said material to obtain a desired reduction in said thickness;

means for strip annealing said material; and means for selectively heating edge and near-edge portions of said material without significantly annealing the bulk of said material prior to said material passing into said strip annealing means to increase the ductility of said portions and to increase said strip annealability by reducing the possibility of strip fracture as a result of the propagation of edge cracks.

22. The apparatus of claim 21 wherein said selective heatiing means comprises:

means for heating said edge and near-edge portions by radiation.

23. The apparatus of claim 22 further comprising:

means for applying a radiation absorbant coating to said edge and near-edge portions prior to said heating.

24. The apparatus of claim 21 wherein said selective heating means comprises:

means for inductively heating said edge and near-edge portions.

25. The apparatus of claim 21 further comprising:

means for providing a protective atmosphere about said edge and near-edge portions so that said heating does not cause substantially any oxidation of said strip material.

26. The apparatus of claim 21 wherein:

said strip annealing means comprises looper rolls about which said strip material passes and means for applying a forward tensile force to said strip material to pull said strip material through said strip annealing means, whereby said selective heating of said edge and near-edge portions reduces the stresses in said material caused by passing said strip about said looper rolls and by said forward tensile force.

* * * * *